July 9, 1929.  G. A. YEATON  1,720,069
CHOKER HOOK
Filed May 31, 1927    2 Sheets-Sheet 1
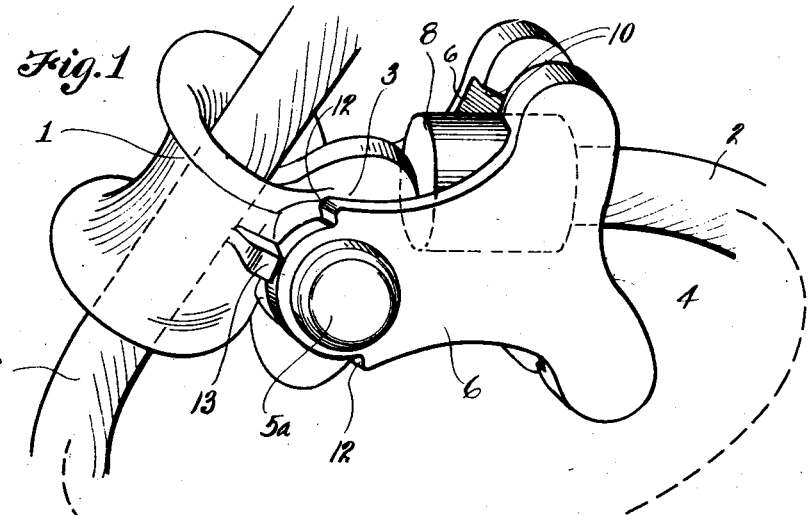
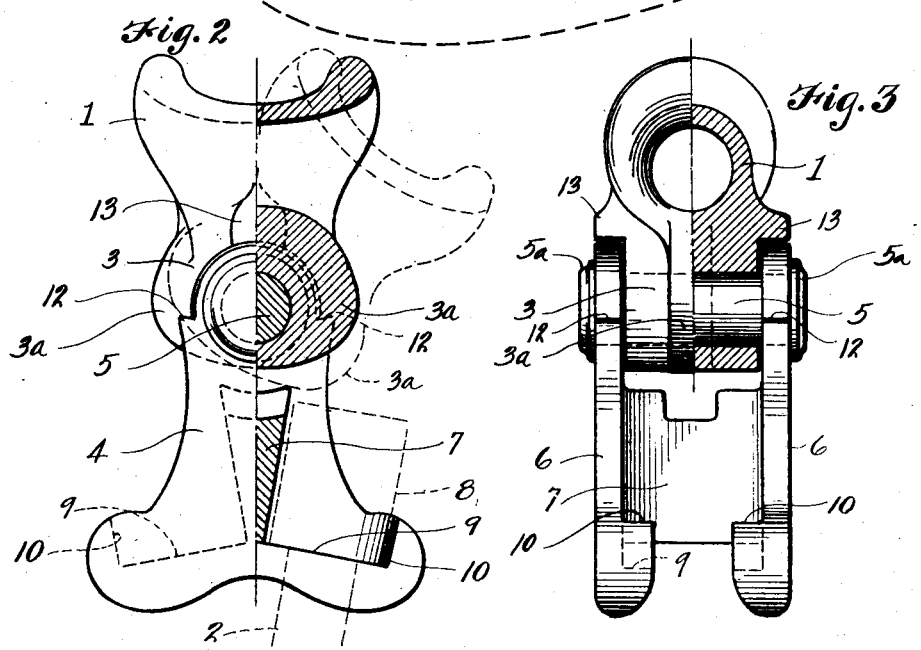
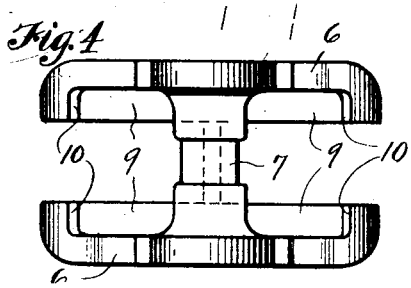
INVENTOR
GEORGE A. YEATON
BY
Richard J. Cork
ATTORNEY July 9, 1929.  G. A. YEATON  1,720,069
CHOKER HOOK
Filed May 31, 1927   2 Sheets-Sheet 2
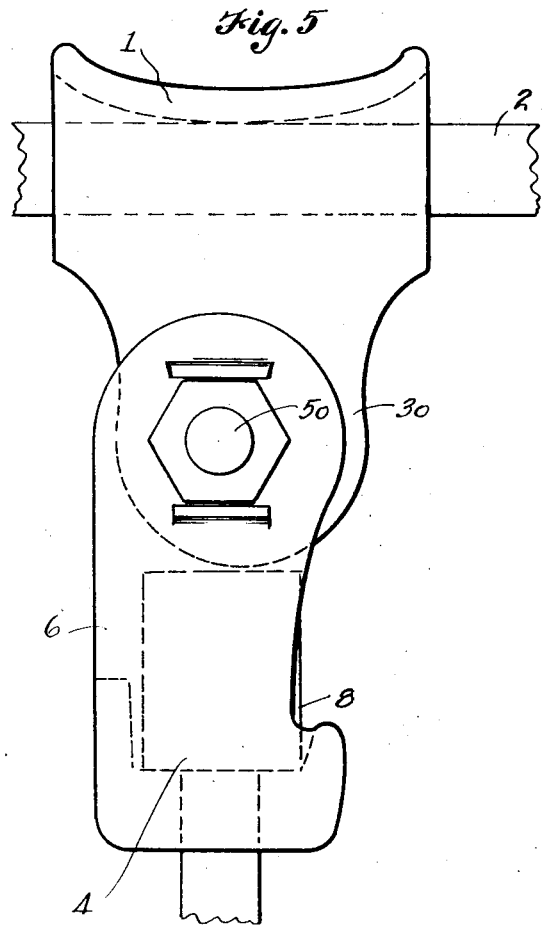
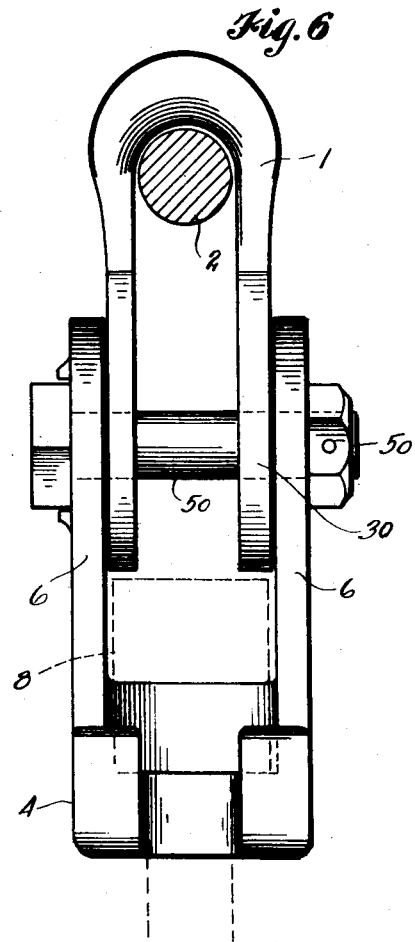
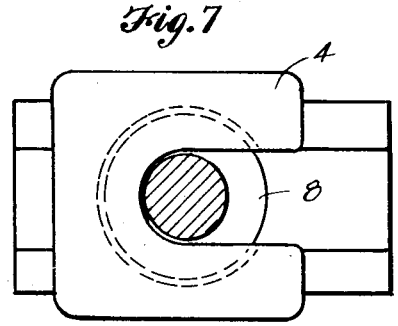
INVENTOR
George A. Yeaton
BY
Richard J. Cook
ATTORNEY Patented July 9, 1929.

1,720,069

UNITED STATES PATENT OFFICE.

GEORGE A. YEATON, OF ABERDEEN, WASHINGTON, ASSIGNOR OF ONE-HALF TO WILLIAM ESALHORST, OF ABERDEEN, WASHINGTON.

CHOKER HOOK.

Application filed May 31, 1927. Serial No. 195,448.

This invention relates to improvements in logging devices, and more particularly to what is commonly known in the logging industry as choker hooks. The principal object of the present invention is to provide a choker hook for use with a choker line, or cable in forming a slip noose for encircling one or more logs, and which provides for an easy connection with or disconnection of the cable end therefrom and which is of such construction as to prevent the hook from being inadvertently detached while in use.

More specifically stated, the object of the present invention resides in the provision of a hook of the above stated character embodying a slip sleeve through which the choker cable is slidably extended and to which is pivotally attached a hook portion provided with a socket for seating therein a ferruled enlargement at the end of the choker cable; the sleeve being provided with a flange eccentric to the pivotal connection which is automatically positioned incidental to use of the hook to prevent unseating of the cable end and the disconnection of the cable from the hook, but which is adjustable, when the cable is not taut, to a position which permits of an easy disconnection.

A further object of the invention is to provide the hook with a plurality of sockets for the attachment of cables thereto, so that several logs or groups of logs may be connected to a haul-in line by means of the same hook.

Other objects of the invention reside in the various details of construction and in the combination of parts as is hereinafter described.

In accomplishing these and other objects of the invention, I have provided the improved details of construction, the preferred forms of which are illustrated in the accompanying drawings, wherein—

Figure 1 is a perspective view of a choker hook embodied by the present invention, showing the choker line applied thereto.

Figure 2 is a side view, showing one-half of the hook in central, vertical section in a plane perpendicular to the pivot pin that connects the two parts.

Figure 3 is an edge view of the hook as shown in Figure 2; a part of the upper portion of the hook being shown in cross section.

Figure 4 is an upper end view of the body portion detached from the sleeve.

Figure 5 is a side view of a hook of an alternative construction.

Figure 6 is an edge view of the same.

Figure 7 is an end view of the hook.

Referring more in detail to the drawings—

1 designates a slip sleeve through which a choker cable, or line, designated at 2, may slide and which is flared and rounded out at its ends so as to prevent undue wear on this part and on the cable which operates through it. This sleeve has an integrally formed extension, or flange, 3 formed along the lower side, as shown in Figures 2 and 3, to which the hook body, designated in its entirety by reference character 4, is pivotally connected by means of a pivot pin, or bolt, 5.

The hook body comprises opposite side flanges 6—6 that are joined in spaced, parallel relation by an integral transverse web 7 that extends in the central longitudinal direction of the hook and which separates the hook body into two parts for the attachment of the two cable ends thereto. The extension 3 of the sleeve is fitted between the upper ends of the side flanges of the hook body and the pivot pin 5 extends through both the flanges and through the sleeve extension and is held against displacement by suitable heads, or nuts, 5ª at its ends.

The opposite side flanges of the hook body are spaced apart so as to provide laterally opening slots which extend through the base of the body and which provides for the application of the ends of the choker cables between the flanges. The choker cables are equipped at their ends with ferruled enlargements 8 and the flanges of the hook body have their inner faces recessed so as to provide upwardly facing seats 9 upon which the inner ends of these ferruled enlargements may seat, and also providing shoulders 10 that are spaced from the web 7 and face toward the latter and which prevent the ferrules, when seated, from slipping outwardly from the hook.

When the slip noose, that is provided by extending the cable 2 through the sleeve and then connecting its end to the hook, is applied about a log, or a plurality of logs, and the noose is drawn tight the sleeve will be drawn into an angular relation with respect to the hook body, as is shown in Figure 1, and in dotted lines in Figure 2, and in order to prevent the ferruled end of the cable from being inadvertantly unseated while the device is in use, the attaching flange 3 of the sleeve is formed with portions 3ª that are eccentric with respect to the pivot 5 and which are adapted, by the adjustment of the sleeve to the angular relation shown in Figure 1 or in Figure 2, to closely overlie the outer end of the ferrules so as to prevent their being lifted sufficiently from the seat to permit their clearing the retaining shoulders and being unseated from the hook. The eccentric portions 3ª are provided to overlie both of the sockets of the hook so that it may be used in reversed positions.

In order that the sleeve portion may not rotate sufficiently on the pivot pin that it would prevent the application of the ferrule to the socket, I have provided stop shoulders 12 on the flange 6 at opposite sides of the pivot pin, and have provided a projecting lug 13 on the sleeve which is adapted to engage with these shoulders to thereby limit the rotative movement of the sleeve in opopsite directions.

Assuming the device to be so constructed, its use would be as follows: First, the choker cable 2 is extended through the slip sleeve 1 and the ferrules are applied and fixed to the end of the cable. The cable is then extended about the log, or logs, to be moved and its ferruled end seated within the socket of the hook to provide a noose which will be tightened when the cable is drawn in by its connection with a haul-in line. When the choker cable is drawn taut the sleeve is rotated on the pivot substantially to the position in which it is shown in dotted lines in Figure 2 and this draws the eccentric portion 3ª of its mounting flange directly over or against the upper end of the ferrule, so that it cannot become unseated from the hook. When it is desired to release the chocker line from the logs it is slackened sufficiently to permit the sleeve to be returned to normal position with respect to the hook body, as shown in full lines in Figure 2, and this removes the eccentric portion of the mounting flange sufficiently from the end of the ferrule that it may be lifted clear of the retaining shoulders in the hook.

By the provision of the double socketed hook, it is also possible to connect the end of another choker cable with this hook so that one or more sets of logs may be hauled in by one choker line connection with the haul-in line. An advantage of the present hook resides in the fact that it is not necessary to kink the cable to a right angular relation with respect to the hook for the unseating of the ferruled end as is required in many of the present-day choker hooks, but it is only required that sufficient slack be provided to permit the sleeve to be rotated to normal position and the ferrule lifted sufficiently to clear the shoulders 10. The cable may then be swung outwardly between the flanges and thus disconnected from the hook.

In Figures 5, 6 and 7 is shown an alternative construction in which the cable receiving sleeve 1 is provided with spaced apart side plates 3ª—3ª which fit between the spaced apart opposite side flanges 6—6 of the hook body 4 and which are pivotally connected therewith by a removable pivot pin, or bolt, 50. The space between the flanges 30 is sufficient that the cable 2 may be removed from the sleeve between the flanges by removal of the pin 50 and detachment of the sleeve from the hook body. This provides for a quick and easy replacement in the event that the choker line becomes damaged and does not require that the hook and all be put out of commission until the cable is required or replaced.

In this latter construction, the hook is shown to be of the single socket type and receives the ferrule at the end of the choker line in the same manner as heretofore described in connection with Figure 1 and the flanges 30—30 are formed eccentric of the pivot pin so as to function in a manner like that of the flanges 32 in holding the ferrule seated or in permitting it to be unseated by movement of the sleeve to a certain angular relation with respect to the hook body 4.

Hooks of this charactr may be made in various sizes and of various materials and it is readily apparent that the details of construction could be changed without departing from the spirit of the invention, and for this reason I do not wish to limit the claims only to the details of construction shown.

Having thus described my invention, what I claim as new therein and desire to secure by Letters-Patent, is:

1. In combination, a choker cable having a retaining enlargement at its end and a choker hook comprising a slip sleeve through which the cable is extended and provided with an attaching flange, a hook body pivotally connected with the flange and having spaced apart side walls providing a lateral opening between them which continues through the base of the hook for passing the cable and recesses in the side flanges forming a seat for receiving and supporting the retaining enlargement at the cable end; said sleeve flange being formed eccentric of its pivotal connection and adapted to be moved, by adjustment of the sleeve to the position it assumes in use, to engage the enlargement to prevent its removal from the seat.

2. In combination, a choker cable having a retaining enlargement at its end and a choker hook comprising a slip sleeve through which the cable is extended and provided with a mounting flange along its lower side, and a hook body comprising spaced apart side walls disposed at opposite sides of said sleeve flange, a pin extended through the hook walls and flange to pivotally connect the parts, and upwardly opening sockets provided in the hook between the side walls for seating the enlargement at the end of the cable as a means of connecting the cable end thereto; said mounting flange of the sleeve having portions extended eccentric of the pivot pin and adapted to be automatically positioned by functional application of the hook to prevent displacement of the enlargement from a seat.

3. In combination, a choker cable having a retaining enlargement at its end and a choker hook comprising a slip sleeve through which the cable is extended and provided with a mounting flange along its lower side, and a hook body comprising spaced apart side walls disposed at opposite sides of said sleeve flange, a pin extended through the hook walls and flange to pivotally connect the parts; said hook body having upwardly opening sockets formed at opposite sides of its longitudinal center for seating the enlargement of the cable end and said sleeve mounting flange being extended at opposite sides eccentrically of its pivot so as to overlie the sockets when swung to one side or the other to thereby preclude removal of the enlargement from its seat.

4. In combination, a choker cable having a retaining enlargement at its end and a choker hook comprising a slip sleeve through which the cable is extended and provided with a mounting flange along its lower side, and a hook body comprising spaced apart side walls disposed at opposite sides of said sleeve flange, a pin extended through the hook walls and flange to pivotally connect the parts; said hook body having upwardly opening sockets formed at opposite sides of its longitudinal center for seating the enlargement of the cable end and said sleeve mounting flange being extended at opposite sides eccentrically of its pivot so as to overlie the sockets when swung to one side or the other to thereby preclude removal of the enlargement from its seat and means for limiting the pivotal movement of the sleeve with respect to the hook.

5. In combination, a choker cable having a retaining enlargement at its end and a choker hook comprising a slip sleeve through which the cable is extended and provided with a mounting flange along its lower side, and a hook body comprising spaced apart side walls disposed at opposite sides of said sleeve flange, a pin extended through the hook walls and flange to pivotally connect the parts; said hook body having upwardly opening sockets formed at opposite sides of its longitudinal center for seating the enlargement of the cable end and said sleeve mounting flange being extended at opposite sides eccentrically of its pivot so as to overlie the sockets when swung to one side or the other to thereby preclude removal of the enlargement from its seat, stop shoulders formed on the hook and a lug on the sleeve engageable therewith to limit the rotative movement of the sleeve in opposite directions with respect to the hook.

Signed at Aberdeen, Washington, this 26th day of March, 1927.

GEORGE A. YEATON.